Sept. 8, 1936.  J. W. OSTEN  2,053,576
RADIATOR FRONT
Filed Oct. 28, 1935
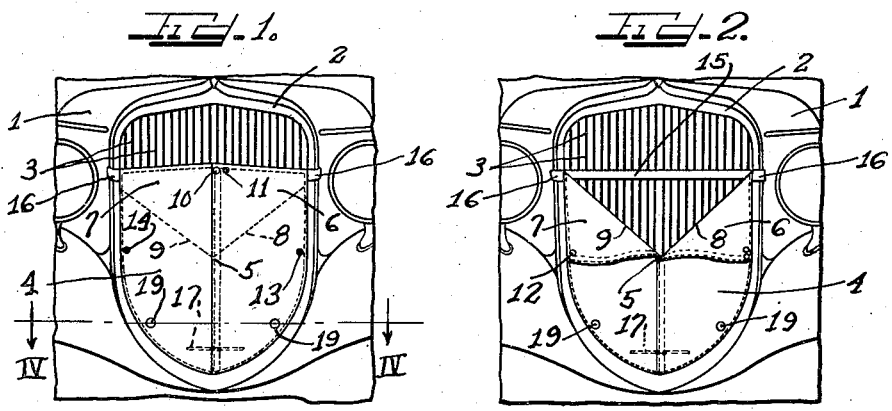
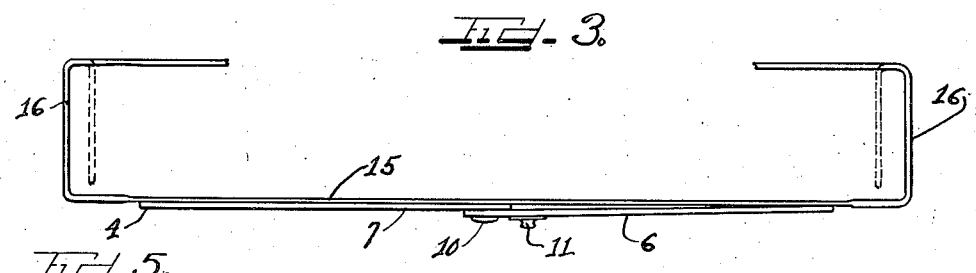
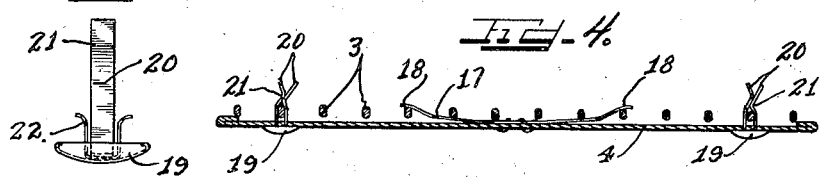
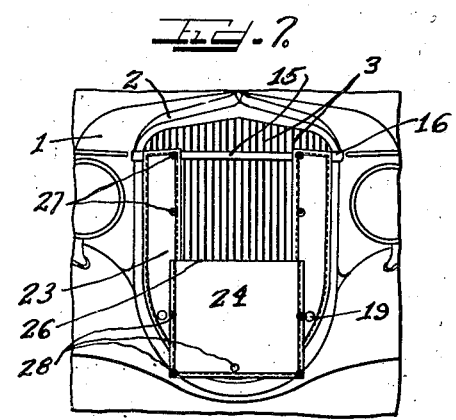
Inventor
Joseph W. Osten.

Patented Sept. 8, 1936

2,053,576

UNITED STATES PATENT OFFICE 2,053,576

RADIATOR FRONT

Joseph W. Osten, Chicago, Ill.

Application October 28, 1935, Serial No. 47,010

8 Claims. (Cl. 257—132)

In driving automobiles in cold weather, the amount of air admitted through the radiator shell is frequently in excess of the amount required for cooling the engine, so that the engine does not heat up properly. The excess amount of cold air admitted into the open radiator shell also acts to keep the water in the cooling system at a low temperature, so that any hot water heaters connected with the water system are slow to respond and consequently are not very efficient in supplying heat for the heating of the interior of an automobile.

The present invention relates to radiator fronts which are conveniently and removably attachable to cover the major portion of the radiator shell grille, and said radiator front is constructed with flaps, one or more of which may be turned down and snapped into open position to expose a larger area of the radiator shell grille in case the engine heats up too much.

It is an object of this invention to provide an automobile radiator front or cover which will cover the major portion of the radiator shell grille, and which furthermore is constructed with one or more flaps which are movable into positions for varying the exposed area of the radiator shell grille.

It is also an object of this invention to provide a radiator front or cover having means for securing the same to the radiator shell and to the radiator shell grille, and constructed to permit sections of the front to be folded over and releasably attached to the main body of the front to increase the area of exposure of the radiator shell grille when required.

It is an important object of this invention to provide an automobile radiator front or cover constructed of a flexible material and having attaching means secured thereto for releasably securing the front or cover to a radiator shell and grille, said front or cover being constructed to permit portions thereof to be opened or folded over to increase the area of exposure of the radiator shell grille.

Other and further important objects of this invention will be apparent from the disclosures in the specification and the accompanying drawing.

The invention (in a preferred form) is illustrated in the drawing and hereinafter more fully described.

On the drawing:

Figure 1 is a fragmentary front elevation of an automobile illustrating the radiator shell and grille having mounted thereon an improved front or cover in closed position embodying the principles of this invention.

Figure 2 is a view similar to Figure 1 illustrating the flaps turned down and buttoned in open position.

Figure 3 is an enlarged top plan view of the radiator front showing the retaining straps partially bent into position to fit around the radiator shell and illustrating in dotted lines the final bent over position of the ends of the retaining straps to project between the shell and the core of the radiator.

Figure 4 is an enlarged sectional view taken on line IV—IV of Figure 1 illustrating the spring fasteners of the retaining buttons in elevation.

Figure 5 is an enlarged side view of one of the retaining buttons illustrating the spring fasteners and the flexible retaining straps for holding the buttons secured to the fabric of the radiator front.

Figure 6 is a fragmentary front view of a radiator shell having secured across the grille thereof a modified form of radiator front or cover in closed position and illustrating in dotted lines the half opened position of a single flap.

Figure 7 is a similar view illustrating the flap in its lowermost completely opened position.

As shown on the drawing:

The reference numeral 1 indicates an automobile hood, the front end of which fits against the rear portion of the automobile radiator shell 2, the front of which is provided with a grid or grille comprising a plurality of perforated parallel grille rods or bars 3.

Figures 1 to 5 inclusive illustrate one form of radiator front or cover comprising an apron or shield constructed of a selected fabric. The shield 4 is shaped to conform to the configuration of the lower three-fourths of the radiator grille, thereby leaving approximately the upper quarter area of the grille exposed, as clearly illustrated in Figure 1. The shield 4 has the margins thereof properly seamed. The upper edge of the shield 4 is cut at the middle portion with the cut extending downwardly to the point 5, thereby having the slit in the upper portion of the shield form two side flaps 6 and 7. The flaps 6 and 7 are adapted to be folded over along the lines 8 and 9 respectively into the position illustrated in Figure 2 to expose a greater area of the upper portion of the grille. Secured to the corner of the flap 6 is a snap socket 10 and a snap button 11 adjacent thereto. The snap socket 10, when the flap is closed, is adapted to snap over a snap button 12 mounted on the corner of the adjacent flap 7. Secured to about the middle portion of one side of the shield 4 is a snap socket 13 which is directly opposite a snap socket 14 secured along the opposite edge of the shield. The socket 13 is positioned to receive the snap button 11 when the flap 6 is in its open position, while the snap socket 14 is adapted to receive the snap button 12 when the flap 17 is swung downwardly as illustrated in Figure 2.

Extending across the rear of the top margin of the apron or shield 4 is a supporting strap 15 to which the upper corners of the shield 4 are securely fastened. The supporting strap 15 extends beyond each of the sides of the shield 4 to form hollow sleeves within which are inserted metal straps or bars of light weight material which are adapted to be flexed or bent over, as hereinafter more fully described. The sleeves with the metal inserts contained therein form mounting arms 16. The flexible arms are adapted to be bent around the sides of the radiator shell and inserted between the hood and the radiator shell, after which the end portions of the arms 16 are adapted to be bent inwardly, as illustrated in dotted lines in Figure 3, to extend into the space between the inner side of the radiator shell and the core of the radiator.

A flat steel strap spring 17 has the middle portion thereof rigidly secured or fastened to the middle of the lower portion of the shield 4 against the inside surface of the shield. The strap spring 17 has the end portions thereof deflected to form retaining hooks or fingers 18 (Figure 4) which are adapted to be inserted behind two of the grille bars 3, as clearly illustrated in Figure 4, to hold the lower end of the apron or shield 4 secured against the front of the radiator grille.

To assist in holding the sides of the lower portion of the apron 4 against the grille, each side margin of the shield is provided with a button head 19 having rigidly secured therein the bight portion of a pair of strap metal snap springs 20 which are deflected in opposite directions at 21 allowing the strap springs 20 to fit together, as clearly illustrated in Figure 4, to snap over grille bars 3. Extending through the button head 19 at substantially right angles to the bight portion of the snap springs 20 is a flexible metal fastening strap 22, the ends of which extend outwardly, as illustrated in Figure 5, to permit the button to be rigidly fastened to the margin of the shield 4.

Figures 6 and 7 illustrate a modified form of radiator cover or front of a single multiple fold flap type of construction. In this form of the radiator front the various means for securing the same in position on a radiator shell are the same as those illustrated and described in connection with Figures 1 to 5 inclusive and like reference numerals are used to designate the like parts. The modified form of radiator front comprises an apron or shield 23 constructed of fabric or other suitable material having the edges thereof properly seamed and being of a shape to conform to the configuration of the grille of a radiator shield for a particular make and model of an automobile. As clearly illustrated in Figures 6 and 7, the shield extends from the bottom of the grille upwardly to within a short distance of the upper end thereof, leaving a section of the grille exposed at all times. The upper middle portion of the shield 23 is cut to provide a single flap 24 which extends substantially half way down the shield and is adapted to be bent along the line 25 into a half open position or along the line 26 into a full open position to expose a larger area of the radiator grille. The radiator cover or shield is provided with a plurality of snap buttons 27 and snap sockets 28 which are arranged as illustrated in Figures 6 and 7 to permit the flap to be secured in either a half open position or in a completely opened position as desired.

It will of course be understood that various details of construction may be varied through a wide range without departing from the principles of this invention, and it is therefore not the purpose to limit the patent granted hereon otherwise than necessitated by the scope of the appended claims.

I claim as my invention:

1. A radiator front comprising a flexible shield shaped to substantially conform to the shape of an automobile radiator grille and of a size to leave the upper portion of the grille exposed, a flap forming a part of the shield and adapted to be opened to expose a larger area of the radiator grille, means for securing the flap in closed and open positions, a strap spring secured on the back of the lower portion of the shield for engagement with radiator grille bars to hold the lower end of the shield in place, a strap secured across the back of the upper margin of the shield and attached to the upper corners of the shield, said strap having the ends thereof extending beyond the sides of the shield, and flexible metal strips enclosed in the projecting ends of the strap and bendable around the frame of the radiator shell for holding the upper portion of the radiator front secured in place.

2. An automobile radiator front comprising a flexible shield, a flap forming a part thereof, means on the flap and on the shield for permitting the flap to be secured in either open or closed position, a mounting spring secured on the back of the lower portion of the shield for engagement with the radiator grille bars, and normally straight flexible mountings at the upper end of the shield adapted to be bent around the frame of the radiator shell to support the radiator front in position.

3. An automobile radiator front comprising a flexible shield formed to provide one or more flaps, snap fasteners secured to the shield to permit the flaps to be secured in open and closed positions, a strap spring secured to the back of the lower portion of the shield for securing the shield in position on a radiator grille, retaining buttons secured to the sides of the shield, each of said buttons containing strap springs for engaging over the bars of the radiator grille to hold the sides of the shield in place, a strap secured across the back of the upper portion of the shield and extending beyond the sides of the shield, and flexible metal inserts engaged in the end portions of the strap to permit the same to be bent around the frame of a radiator shell to hold the upper portion of the shield secured in place.

4. An automobile radiator front for partially closing the radiator grille, said front comprising a shield of flexible material and formed to provide a flap, means on the shield and flap for holding the flap in closed and open positions, a spring member secured on the back of the lower portion of the shield for securing the lower end of the shield in place, and a strap secured across the back of the upper portion of the shield and having the ends of the strap filled with metal strips bendable for securing the upper portion of the shield in place on a radiator.

5. A radiator front comprising a flexible shield formed to provide one or more flaps, means for securing the lower portion of the shield to a radiator grille, a flexible hollow strap secured across the back of the upper portion of the shield and extending beyond the sides of the shield, and flexible members in the projecting ends of the strap bendable around a radiator shell frame for securing the upper end of the shield in place on an automobile radiator.

6. An automobile radiator front comprising a flexible shield, flap means formed thereon, means for holding the flap means in closed and open positions, grille gripper means secured to the lower portion of the shield for securing the same on a radiator grille, and strap means on the upper end of the shield for engagement between the radiator shell and the automobile hood and bendable around the radiator shell frame.

7. An automobile radiator front comprising a flexible shield including opening flaps, a strap spring secured on the back of the lower portion of the shield, a strap secured across and extending beyond the sides of the upper portion of the shield, and flexible metal bars in the end portions of the strap.

8. An automobile radiator front comprising a shield including an opening flap, and a mounting strap secured across and extending beyond the shield and having flexible metal strips enclosed in the projecting ends thereof adapted to be bent around the radiator shell frame to support the radiator front in position.

JOSEPH W. OSTEN.